US009870731B2

(12) United States Patent
Jiang et al.

(10) Patent No.: US 9,870,731 B2
(45) Date of Patent: Jan. 16, 2018

(54) WEAR COMPENSATION FOR A DISPLAY

(71) Applicant: Intel Corporation, Santa Clara, CA (US)

(72) Inventors: Jun Jiang, Portland, OR (US); Zhiming J. Zhuang, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 14/750,889

(22) Filed: Jun. 25, 2015

(65) Prior Publication Data

US 2016/0379550 A1 Dec. 29, 2016

(51) Int. Cl.
*G06F 3/038* (2013.01)
*G09G 3/3208* (2016.01)

(52) U.S. Cl.
CPC ..... *G09G 3/3208* (2013.01); *G09G 2320/029* (2013.01); *G09G 2320/0285* (2013.01); *G09G 2320/048* (2013.01); *G09G 2320/103* (2013.01)

(58) Field of Classification Search
CPC ........... G09G 2320/043; G09G 3/3208; G09G 2320/029; G09G 2320/0285; G09G 2320/0295; G09G 2320/045; G09G 2320/0242; G09G 2340/16; G06F 11/3003
See application file for complete search history.

(56) References Cited

U.S. PATENT DOCUMENTS

2004/0212573 A1 10/2004 Sundahl et al.
2005/0110728 A1 5/2005 Cok
2005/0110807 A1* 5/2005 Chang .................. G09G 3/3208 345/690
2006/0022305 A1 2/2006 Yamashita
2006/0164407 A1 7/2006 Cok
2011/0227964 A1 9/2011 Chaji et al.
2012/0133835 A1 5/2012 Van Heesch et al.
(Continued)

FOREIGN PATENT DOCUMENTS

KR 20150025987 A 3/2015

OTHER PUBLICATIONS

PCT International Search Report, PCT Application No. PCT/US2016/028634, dated Jul. 28, 2016, 3 pages.
(Continued)

*Primary Examiner* — Hau Nguyen

(74) *Attorney, Agent, or Firm* — International IP Law Group, P.L.L.C.

(57) ABSTRACT

Techniques for implementing aging compensation for a display are described. An example of an electronic device includes a display comprising pixels, each pixel comprising one or more Light Emitting Diodes (LEDs). The electronic device also includes a display aging compensation unit to receive input frame data corresponding to content to be displayed, adjust the input frame data to generate output frame data based on a degree of aging of the LEDs, and send the output frame data to the display. The electronic device also includes a display aging monitoring and compensation processing unit to accumulate aging data that describes the degree of aging of the LEDs. The aging data is to be accumulated by sampling the output frame data at a sampling rate that varies depending on a type of the content to be displayed.

25 Claims, 5 Drawing Sheets

(56) References Cited

U.S. PATENT DOCUMENTS

| | | | | |
|---|---|---|---|---|
| 2012/0299973 | A1 | 11/2012 | Jaffari et al. | |
| 2014/0043318 | A1 | 2/2014 | Choo et al. | |
| 2014/0055500 | A1* | 2/2014 | Lai | G09G 3/3208<br>345/690 |
| 2014/0168039 | A1 | 6/2014 | Kim et al. | |
| 2014/0168192 | A1 | 6/2014 | Jeong et al. | |
| 2014/0267444 | A1 | 9/2014 | Hwang et al. | |
| 2014/0267448 | A1* | 9/2014 | Albrecht | G09G 3/3406<br>345/690 |
| 2014/0306868 | A1 | 10/2014 | Chaji | |
| 2014/0375701 | A1 | 12/2014 | Chaji et al. | |
| 2015/0062202 | A1 | 3/2015 | Lu | |
| 2015/0103106 | A1* | 4/2015 | Chaji | G09G 3/3291<br>345/690 |

OTHER PUBLICATIONS

PCT International Search Report, PCT Application No. PCT/US2016/028839, dated Jul. 28, 2016, 3 pages.

PCT International Search Report, PCT Application No. PCT/US2017/015404, dated May 16, 2017, 3 pages.

* cited by examiner

200

300

500

WEAR COMPENSATION FOR A DISPLAY

CROSS-REFERENCE TO RELATED APPLICATIONS

The present application is related to U.S. patent application Ser. No. 14/751,015 entitled "Wear Compensation for a Display," filed on Jun. 25, 2015.

TECHNICAL FIELD

This disclosure relates generally to techniques for operating an electronic display. More specifically, the disclosure describes techniques for implementing wear compensation in a display such as a Light Emitting Diode (LED) display or an Organic LED (OLED) display.

BACKGROUND

OLEDs can be used to create digital displays in devices such as television screens, computer monitors, smart phones, gaming consoles, and others. OLEDs provide several advantages compared to other display technologies, including higher color gamut, lighter and thinner display panels, better power efficiency, and others. However, the materials used to make OLEDs tend to degrade faster compared to some display technologies. Degradation in OLED displays is characterized by the loss of luminance over time. Because the degradation rate is different for the three primary colors and because degradation is not uniform among all pixels due to different usage, undesirable effects such as color shift and burn-in can take place.

DETAILED DESCRIPTION

The subject matter disclosed herein relates to techniques to compensate for the wear experienced by an OLED display. As explained above, OLED displays tend to degrade faster compared to other display technologies, which can lead to color shifting and screen burn-in. This has prevented the widespread adoption of OLED displays in Personal Computers (PCs). To reduce the effects of OLED wear, compensation techniques can be applied to compensate the gradual loss of luminance that OLED displays experience over time. In one type of compensation technique, the display operating history is tracked and used to determine an expected degree of luminance degradation for each pixel. For example, the display input frame data can be sampled at a fixed frequency and accumulated over time to determine the effective aging time experienced by individual pixels. Such tracking can quickly consume a large amount of memory and processing resources.

This disclosure describes techniques to reduce the amount of system resource used for collecting OLED aging data to more manageable levels. More specifically, the present disclosure provides techniques for controlling the sampling rate of data collection to control the amount of data collected while ensuring that sufficient pixel aging data is collected for effective wear compensation.

In some examples, the sampling frequency can be based on the content being displayed. For example, a PC can display a wide variety of content, including static and dynamic content. Static content is content that is relatively constant over time, such as an image of a desktop or word document. Dynamic content is content that tends to change more rapidly over time, such as a streaming video or game graphics. The sampling rate for aging data collection can be adjusted based on whether the screen is displaying static content or dynamic content. For dynamic images, aging data collection can be performed at a specified sampling frequency. For static images, aging data collection can be performed at a lower sampling frequency compared to the sampling frequency specified for dynamic images. Sampling at a lower frequency for static images reduces processor loading and memory usage, without sacrificing the detail and accuracy of the aging data. In this way, a balance can be achieved between resource usage and performance.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
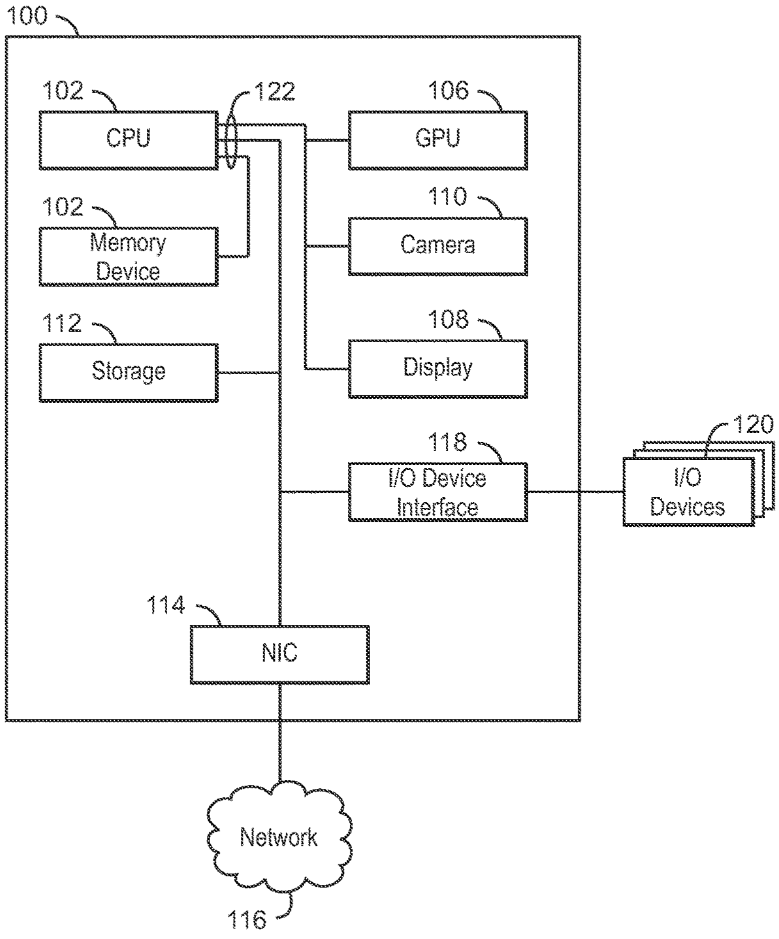
FIG. 1 is a block diagram of an example electronic device that can implement the wear compensation techniques described herein.

FIG. 1 is a block diagram of an example electronic device that can implement the wear compensation techniques described herein. The computing device 100 may be, for example, a computing device such as smart phone, laptop computer, ultrabook, desktop computer, or tablet computer, among others. The computing device 100 may also be a display device such as a digital sign or television, for example. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes video signals or computer generated graphics. The graphics processor 106 is configured to process data related to the generation of graphics to be sent to a display 108. The display 108 may be a built-in component of the computing device 100 or externally coupled to the computing device 100. In some examples, the display is an OLED display. However, the present techniques can also be implemented in any type of display that uses arrayed emitters for display illumination, such as plasma displays, or displays that use other types of LEDs, for example.

The computing device 100 can also include a camera 110 configured to capture still images or video. For example, the camera 110 may be a Web cam. Images or video captured by the camera 110 can be sent to various other components of the computing device 100, such as the display 108.

The computing device 100 may also include a storage device 112. The storage device 112 is a physical memory such as a hard drive, an optical drive, a flash drive, an array of drives, or any combinations thereof. The storage device 112 may also include remote storage devices. The computing device 100 may also include a network interface controller (NIC) 114 configured to connect the computing device 100 through to a network 116. The network 116 may be a wide area network (WAN), local area network (LAN), or the Internet, among others.

The computing device 100 may also include an input/output (I/O) device interface 118 configured to connect the computing device 100 to one or more I/O devices 120. The I/O devices 120 may include, for example, a printer, a scanner, a keyboard, and a pointing device such as a mouse, touchpad, or touchscreen, among others. The I/O devices 120 may be built-in components of the computing device 100, or may be devices that are externally connected to the computing device 100.

Various additional components may be included depending on the design considerations for a particular implementation. For example, the computing device 100 may also include a memory controller hub that handles communications between the processor 102, memory 104, graphics processor 106, I/O device interface 118, and other components.

Communications between various components of the computing device 100 can be performed over one or more data busses 122. The bus architecture shown in FIG. 1 is just one example of a bus architecture that can be used with the techniques disclosed herein. In some examples, the data bus 122 may be a single bus that couples all of the components of the computing device 100 according to a particular communication protocol. Furthermore, the computing device 100 can also include any suitable number of data busses 122 of varying types, which may use different communication protocols to couple specific components of the computing device according to the design considerations of a particular implementation.

The graphics processor may be configured to collect OLED aging data and implement wear compensation based on the OLED aging data. In an OLED display, each pixel may include three diodes, one for the color red, one for the color green, and one for the color blue. For the present disclosure, Red-Green-Blue (RGB) pixels are described. However, it will be appreciated that other arrangements with fewer or more diodes and different colors are also possible. For examples, in addition to the red, green, and blue diodes, each pixel could also have an additional yellow pixel. Each pixel may be activated by a string of data that describes the intensity with which to illuminate of each of the diodes in the pixel. The data that activates the pixels may be referred to herein as RGB data. The term “frame data” refers to the RGB data for all of the pixels for a single frame of display content.

The OLED aging data is a measure of the total accumulated charge that has passed through a particular diode and is a function of the amount of time that a diode has been turned on and the intensity over that time. The graphics processor may collect OLED aging data for each diode of each individual pixel. In some examples, the graphics processor may collect OLED aging data that represents an average of the diodes in a group of pixels. Based on the OLED aging data, the graphics processor can compensate the brightness of each diode of a pixel by adjusting the RGB data before sending the RGB data to the display.

The graphics processor can also determine a sampling rate for sampling the data to be sent to the display. In some examples, the sampling rate can be based on the content being displayed. For example, the graphics processor may use one sampling rate when displaying dynamic content, and another lower sampling rate when sampling static content. In some examples, the sampling rate can be based on user behavior, such as how quickly a user typically advances through a collection of images or menus. In some examples, different sampling rates are used for different areas of the screen. The sampling rate may be determined by the graphics process by on analysis of the received frame data or by another component such as the source of the content to be displayed.

It is to be understood that the block diagram of FIG. 1 is not intended to indicate that the computing device 100 is to include all of the components shown in FIG. 1. Rather, the computing device 100 can include fewer or additional components not illustrated in FIG. 1. Furthermore, the components may be coupled to one another according to any suitable system architecture, including the system architecture shown in FIG. 1 or any other suitable system architecture. For example, embodiments of the present techniques can be implemented in a System-On-a-Chip (SOC), or a multi-chip module.

Figure 2:
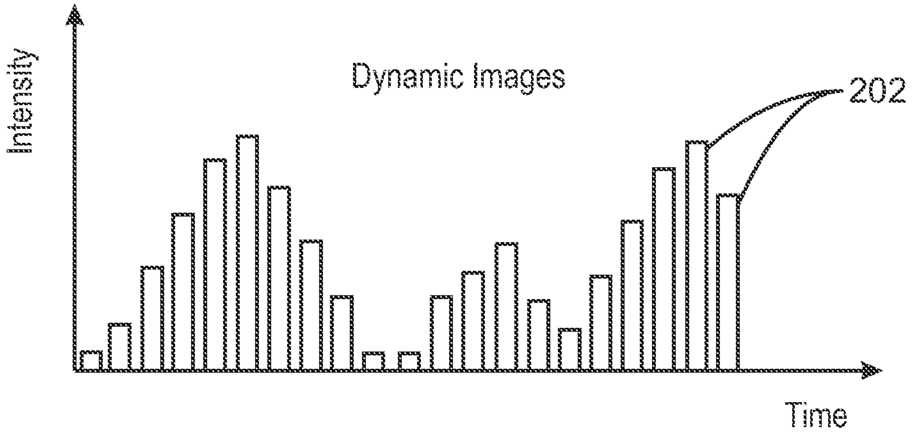
FIG. 2 is a graph of diode intensity over time when displaying dynamic content.

FIG. 2 is a graph of diode intensity over time when displaying dynamic content. In the graph 200 of FIG. 2, the diode intensity is shown on the vertical axis and time is shown on the horizontal axis. Each bar 202 represents the diode intensity of a single OLED at successive intervals of image data. For purposes of the present description each bar 202 represents a different interval, which may be a single frame or a group of frames. The refresh rate is the frequency at which the display panel is refreshed with a new frame of image data. As seen in FIG. 2, the diode intensity undergoes significant changes over small intervals of time. Thus, the graph 200 is indicative of the type of data one would expect for displaying dynamic content. Dynamic content might be expected when displaying streaming video, television programming, or game graphics, for example.

When dynamic content is being displayed, the sampling frequency can be set to a level at or close to the refresh rate of the display. In some examples, when dynamic content is being displayed, the sampling frequency can be set at a multiple of the refresh rate. For example, if the refresh rate is 120 Hertz, the sampling rate may be set to 60 Hz, in which case every other frame will be sampled.

Figure 3:
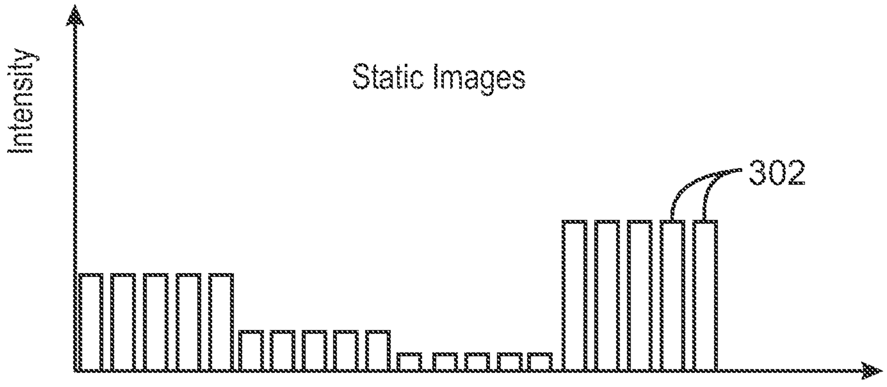
FIG. 3 is a graph of diode intensity over time when displaying static content.

FIG. 3 is a graph of diode intensity over time when displaying static content. In the graph 300 of FIG. 3, the diode intensity is shown on the vertical axis and time is shown on the horizontal axis, and each bar 302 represents the diode intensity of a single OLED at successive intervals of image data. As seen in FIG. 3, the diode intensity tends to be relatively constant over larger intervals of time compared to the dynamic content. The particular diode represented stays constant for five intervals. Thus, the graph 300 is indicative of the type of data one would expect for displaying static content. Static content might be expected when displaying still pictures from an image gallery, a graphical user interface, a menu such as a programming guide, text documents, Web pages, and others.

When static content is being displayed, the sampling frequency can be set to a level lower than the refresh rate of the display and lower than the sampling frequency used for dynamic content. For static content the sampling frequency may be set to a value that is several multiples of the refresh rate. For example, if the refresh rate is 120 Hertz, the sampling rate may be set to 60 Hertz, 30 Hertz, or 10 Hertz. In some cases, if the graphics processor detects that the display is experiencing very little change over an extended period of time, the sampling rate may be reduced even further, for example, one sample per second, or one sample per several seconds.

Figure 4:
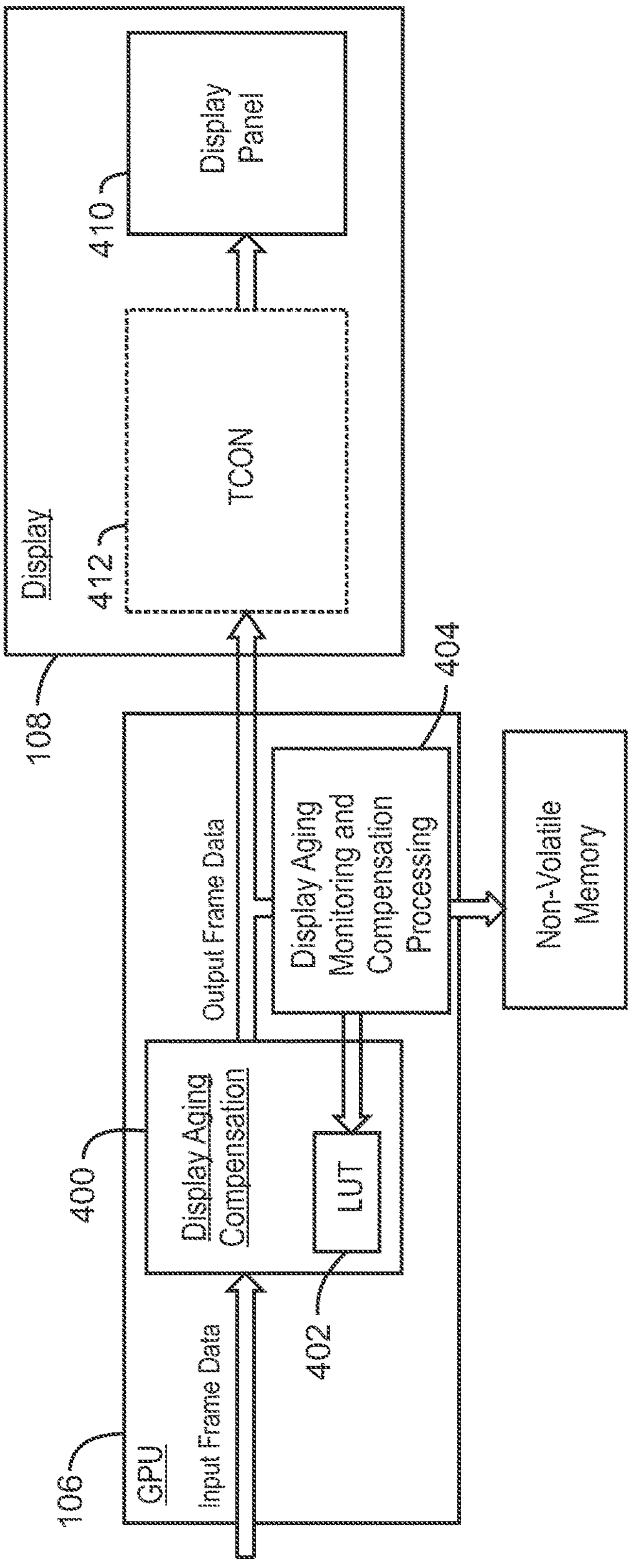
FIG. 4 is a block diagram of an example graphics processing unit configured to monitor device usage and calculate aging data and implement wear compensation based on the data.

FIG. 4 is a block diagram of an example graphics processor configured to accumulate aging data and implement wear compensation based on the data. The graphics processor 106 includes a display aging compensation unit 400 and a display aging monitoring and compensation processing unit 404. The display aging compensation unit 400 receives input frame data and adjusts the intensity of each OLED of each pixel. The adjustment for a particular OLED is the adjustment that will compensate the OLED for the amount of aging experienced by that OLED. Intensity adjustments to be applied to each OLED may be stored to a lookup table (LUT) 402 by the display aging monitoring and compensation processing unit 404. The data stored to the lookup table can be based on predetermined device decay models for each type of OLED and relates the amount of OLED aging to the level of compensation for that OLED.

The display aging monitoring and compensation processing unit 404 samples the frame data that is output from the display aging compensation unit 400 to the display 108. The display aging monitoring and compensation processing unit 404 can determine for each pixel of the display, the degree of aging experienced for each OLED based on the frame data. The data, such as RGB data, specifies the intensity by which each OLED in a pixel is driven. The actual degree of aging is a product of the intensity with which the OLED is being driven and the duration that the OLED is driven at the specified intensity. The OLED will be driven at the intensity specified by the output frame data for the duration of one frame, which depends on the refresh rate. For example, for 60 Hertz refresh rate, the display refreshes 60 times per second and the actual duration of one frame is approximately 1/60 of a second.

If the sampling frequency is less than the frame rate, then a proportion of output frames are sampled and the degree of aging computed by the display aging monitoring and compensation processing unit 404 will be an estimated degree of aging. Specifically, the duration used in the aging calculation will depend on the sampling frequency rather than the actual refresh rate. Thus, the duration used in the aging calculation will be approximately equal to the sample period or some proportion of the sample period. For example, for a sampling rate of 10 Hertz, the duration used in the aging calculation would be approximately 1/10 of a second. If the sampling rate is ten times lower than the actual refresh rate, than the OLED intensity indicated in the sample data is computed to last for ten refresh cycles.

The degree of aging measured for a particular OLED can be used as an input to the LUT 402 to obtain a corresponding degree of compensation to be applied to the OLED to compensate for the aging of the OLED. This processes can be repeated for each OLED and each image frame.

The display aging monitoring and compensation processing unit 404 can also store accumulated aging data to a non-volatile memory 406. For example, the accumulated aging data may be the total level of aging experienced by each pixel or the current compensation adjustment to be applied to each pixel. The non-volatile memory 406 can be the memory device 104 or storage device 112 of FIG. 1, or some other memory device, which may be dedicated to storing the accumulated aging data. The non-volatile memory 406 may also be included in the graphics processor 106 or coupled to the graphics processor 106 through a data bus. Storing the accumulated aging data to the non-volatile memory 406 prevents the aging data from being lost over the life of the display 108, for example, due to power loss.

As mentioned above, the display aging compensation unit 400 receives input frame data, performs wear compensation based on the accumulated aging data stored to the lookup table 402, and outputs compensated frame data to the display 108. The display 108 includes a display panel 410, which includes the matrix of pixels, and a timing controller (TCON) 412. The timing controller 412 is the data sink for the output frame data and drives the display panel 410. The input frame data can be received from any suitable source. With reference to FIG. 1, the source of the input frame data can be an application running on the processor 102, a network interface such as the NIC 114, a television tuner (not shown), one of the I/O devices 120, or the camera 110, among others.

The sampling rate used by the display aging monitoring and compensation processing unit 404 may be determined by the graphics processor 106, or may be received by the graphics processor 106 from another component, such as an application running on the processor 102 (FIG. 1). In some examples, the display aging monitoring and compensation unit 404 determines the sampling rate by analyzing successive frames of input data and identifying the degree of change in the pixels to determine if the content is static or dynamic. The sampling rate may be set to one value for dynamic content and another value for static content. In some examples, the sampling rate may be set to a value proportional to the degree of change in the pixels identified by the graphics processor 106. In some examples, the sampling rate is controlled by specifying a weight factor that describes the relative sampling rate compared to the panel refresh rate. For example, if the panel refresh rate is 60 Hertz and the weight factor is 1, the sampling rate is also 60 Hertz. In this example, a weight factor of 2 would result in a sampling rate of 30 Hertz and for a weight factor of 10 would result in a sampling rate of 6 Hertz. The weight factor may be used to control the sampling rate and may also be used in the aging calculations.

The sampling rate used for sampling dynamic content may be referred to herein as the dynamic sampling rate, and the sampling rate used for sampling static content may be referred to herein as the static sampling rate. In some examples, the display aging monitoring and compensation unit 404 uses a three-step process for shifting the sampling rate from the dynamic sampling rate to the static sampling rate. The three-step process uses a third sampling rate referred to herein as the intermediate sampling rate, which is a value between the dynamic sampling rate and the static sampling rate. In the three-step process, the dynamic sampling rate is used for sampling dynamic content if dynamic content is sensed. If a shift to static content is sensed, the sampling rate can drop to the intermediate sampling rate. The intermediate sampling rate can be used for a specified length of time before dropping to the static sampling rate. If the content remains static for the specified length of time, the sampling rate drops down to the static sampling rate. Otherwise, if dynamic content is sensed before the expiration of the specified length of time, the sampling rate returns to the dynamic rate. This three-step process ensures that the presence of static content is confirmed before dropping to the static sampling rate.

In some examples, the graphics processor 106 receives an indicator from an application such as an operating system, wherein the indicator is used to identify the sampling rate. For example, the indicator may indicate whether the content being displayed is static or dynamic, or the indicator may indicate the actual sampling rate or weight factor to be used. Some display panel may use a Panel Self-Refresh (PSR) mode to save power during times when the display content is not changing. During panel self-refresh mode, the TCON 412 stores a frame of data and used this data to refresh the display panel, and the GPU 106 can enter a low power mode. During panel self-refresh mode, the OLED aging data can be computed based on data received from the TCON 412. For example, the TCON 412 may report data such as the suspend time, Ts, which is the time at which panel self-refresh mode begins, and a resume time, Tr, which the time at which panel self-refresh mode ends. The TCON 412 can also report the number of frame refreshes performed between the suspend time and the resume time. This data can be used in combination with the frame data used by the TCON 412 during panel self-refresh mode to compute the aging of each of the OLEDs during the panel self-refresh mode.

The sampling rate may also be determined, based at least in part, on user behavior which may be measured over time and analyzed to identify an expected degree of change in input frame data. The expected degree of change may be interpreted from the user's navigation habits, such as the speed at which they tend to navigate through menu options, image galleries, Web pages, and the like.

The sampling rate may also be different for different portions of the display panel 410. For example, a window within a display may be showing streaming video, while the background portions surrounding the window may be unchanging. The portions of the display panel 410 used for showing video may be subjected to one sampling rate, while the background portions may be subjected to a lower sampling rate.

It is to be understood that the block diagram of FIG. 4 is not intended to indicate that the graphics processor 106 is to include all of the components shown in FIG. 4. Rather, the graphics processor 106 can include fewer or additional components not illustrated in FIG. 4. Furthermore, the components can be implemented in hardware or a combination of hardware and software. For example, the components may be implemented in one or more Application Specific Integrated Circuits (ASICs), Field Programmable Gate Array (FPGAs), microcontrollers, or an arrangement of logic gates implemented in one or more integrated circuits, for example. Additionally, the components may be implemented in a single processor or multiple processors.

Figure 5:
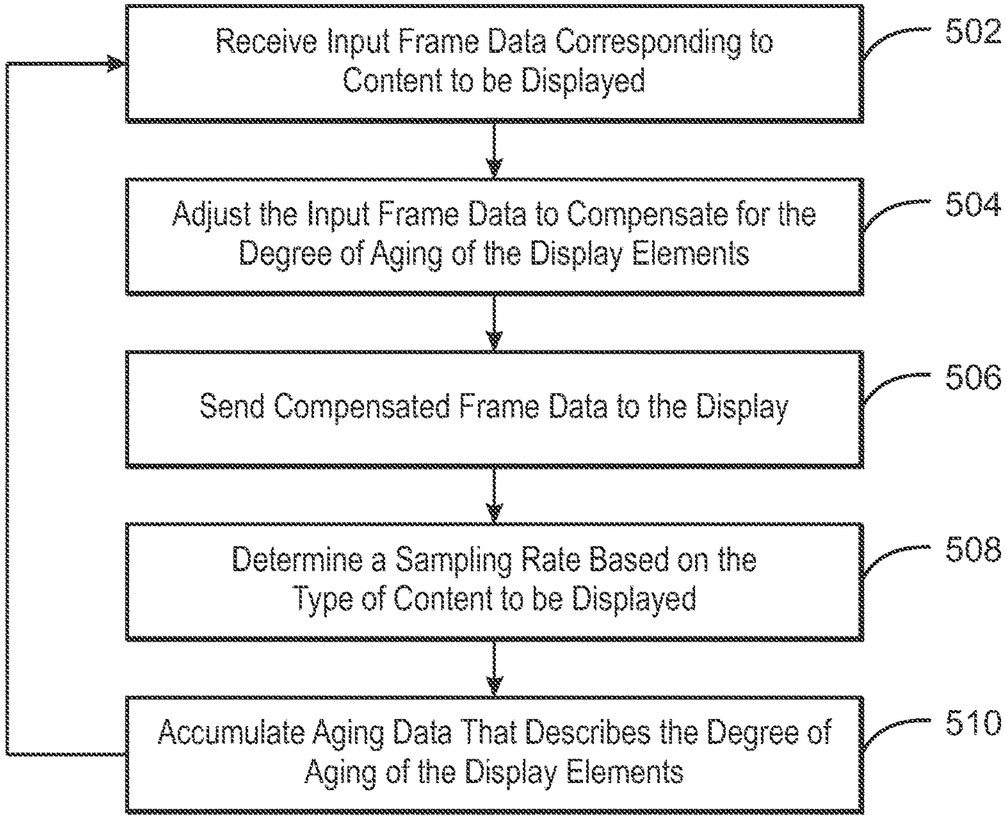
FIG. 5 is a process flow diagram of an example method to implement aging compensation for a display.

FIG. 5 is a process flow diagram of an example method to implement aging compensation for a display. The method 500 may be implemented by any suitable electronic device that includes a pixel-based display, such as the device shown in FIG. 1. The display can include a plurality of display elements, such as LEDs, OLEDs, and others. In some examples, the method 500 is performed by logic included in a graphics processor, such as the graphics processor of FIG. 2. The logic is embodied in hardware, such as logic circuitry, microcontrollers, integrate circuits, or one or more processors configured to execute instructions stored in a non-transitory, computer-readable medium.

At block 502, input frame data corresponding to content to be displayed is received. The content may be dynamic content such as video, or static content such as still images, for example. The content may also be a mixture of dynamic and static content.

At block 504, the input frame data is adjusted to generate output frame data that is compensated based on a degree of aging of the LEDs.

At block 506, the compensated output frame data is sent to the display.

At block 508, a sampling rate is determined based on the type of content to be displayed. For example, determining the sampling rate can include determining a first sampling rate if the content to be displayed is dynamic and determining a second sampling rate if the content to be displayed is static, wherein the second sampling rate is lower than the first sampling rate. The type of content to be displayed can be determined by analyzing the input frame data to identify a degree of change in the input frame data from previous input frames. The sampling rate can also be determined by analyzing user behavior. In some examples, the type of content to be displayed can be determined by receiving one or more content type identifiers from a source of the content, such as an operating system or other application running on a processor. If more than one content type identifier is received, each content type identifier may relate to content to be shown on a specific portion of the display. In some examples, a sampling rate identifier is received from the source of the content to be displayed and the output frame data is sampled at the received sampling rate.

At block 510, the output frame data is sampled at the sampling rate to accumulate aging data that describes the degree of aging of the LEDs. The method may then return to block 502. The accumulated aging data from block 510 is used in the next iteration of the method at block 504.

The method 500 should not be interpreted as meaning that the blocks are necessarily performed in the order shown. Furthermore, fewer or greater actions can be included in the method 500 depending on the design considerations of a particular implementation.

Figure 6:
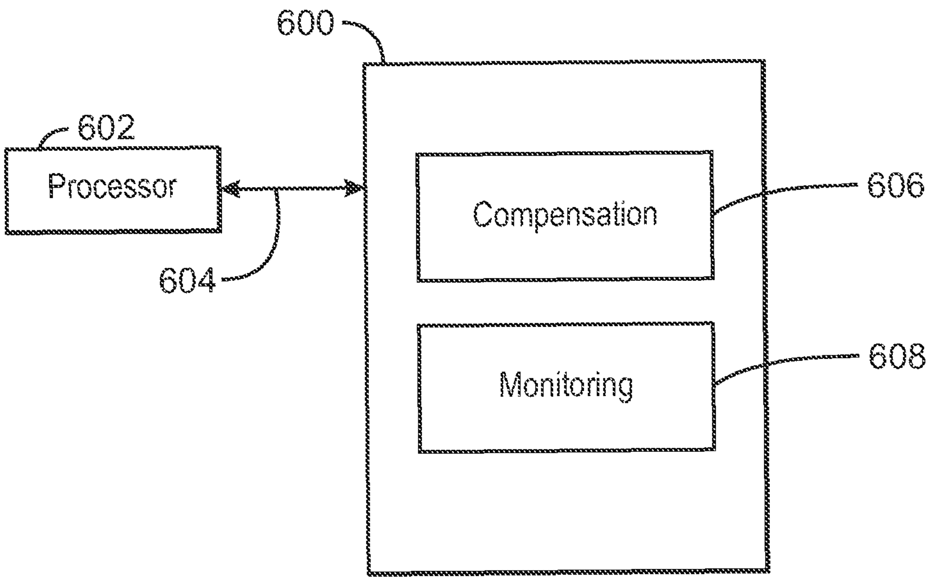
FIG. 6 is a block diagram showing a medium 600 that contains logic for performing aging compensation for a display.

FIG. 6 is a block diagram showing a computer-readable medium 600 that contains logic for performing aging compensation for a display. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606 and 608 configured to perform the techniques described herein. In some embodiments, the modules 606 and 608 may be modules of computer code configured to direct the operations of the processor 602. For example, the compensation module 606 may be configured to receive input frame data corresponding to content to be displayed on a display of an electronic device, adjust the input frame data based on a degree of aging of the LEDs, and send the output frame data to the display. The monitoring module may 608 be configured to sample the output frame data at a sampling rate to accumulate aging data that describes the degree of aging of the LEDs. The sampling rate can be determined based on a type of the content to be displayed.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

EXAMPLES

Example 1 is an electronic device to implement aging compensation for a display. The electronic device includes a display includes pixels, each pixel includes one or more Light Emitting Diodes (LEDs). The electronic device also includes a display aging compensation unit to receive input frame data corresponding to content to be displayed, adjust the input frame data to generate output frame data based on a degree of aging of the LEDs, and send the output frame data to the display. The electronic device also includes an display aging monitoring and compensation processing unit to accumulate aging data that describes the degree of aging of the LEDs. The aging data is to be accumulated by sampling the output frame data at a sampling rate that varies depending on a type of the content to be displayed.

Example 2 includes the electronic device of example 1, including or excluding optional features. In this example, the display aging monitoring and compensation processing unit is to use a first sampling rate if the content to be displayed is dynamic and the display aging monitoring and compensation processing unit is to use a second sampling rate if the content to be displayed is static, wherein the second sampling rate is lower than the first sampling rate.

Example 3 includes the electronic device of any one of examples 1 to 2, including or excluding optional features. In this example, the display aging compensation unit is included in a graphics processor, and the graphics processor determines the type of the content to be displayed based on a degree of change in the input frame data.

Example 4 includes the electronic device of any one of examples 1 to 3, including or excluding optional features. In this example, the type of the content is to be identified by an application that is to generate the content, and the application is to send a corresponding content type identifier to the display aging monitoring and compensation processing unit, wherein the display aging monitoring and compensation processing unit determines the sampling rate based, at least in part, on the content type identifier. Optionally, the application that is to generate the content sends a sampling rate identifier to the display aging monitoring and compensation processing unit, wherein the display aging monitoring and compensation processing unit is to sample the output frame data at the sampling rate identified by the sampling rate identifier.

Example 5 includes the electronic device of any one of examples 1 to 4, including or excluding optional features. In this example, the sampling rate transitions from a dynamic sampling rate to an intermediate sampling rate, and remains at the intermediate sampling rate for a specified amount of time before transitioning to a static sampling rate.

Example 6 includes the electronic device of any one of examples 1 to 5, including or excluding optional features. In this example, the sampling rate to be applied by the display aging monitoring and compensation processing unit is based, at least in part, on past user behavior.

Example 7 includes the electronic device of any one of examples 1 to 6, including or excluding optional features. In this example, the LEDs are Organic LEDs (OLEDS).

Example 8 includes the electronic device of any one of examples 1 to 7, including or excluding optional features. In this example, if the electronic enters a panel self-refresh mode, the aging data can be computed based on data received from a timing controller included in the display.

Example 9 includes the electronic device of any one examples 1 to 8, including or excluding optional features. In this example, the electronic device is a laptop computer.

Example 10 is a method of implementing aging compensation for a display. The method includes receiving input frame data corresponding to content to be displayed on a display of an electronic device. The display includes a plurality of Light Emitting Diodes (LEDs). The method also includes adjusting the input frame data to generate output frame data based on a degree of aging of the LEDs and sending the output frame data to the display. The method also includes determining a sampling rate based on a type of the content to be displayed, and accumulating aging data that describes the degree of aging of the LEDs by sampling the output frame data at the sampling rate.

Example 11 includes the method of example 10, including or excluding optional features. In this example, determining the sampling rate includes determining a first sampling rate if the content to be displayed is dynamic and determining a second sampling rate if the content to be displayed is static, wherein the second sampling rate is lower than the first sampling rate.

Example 12 includes the method of any one of examples 10 to 11, including or excluding optional features. In this example, the method includes determining the type of the content to be displayed by analyzing the input frame data to identify a degree of change in the input frame data.

Example 13 includes the method of any one of examples 10 to 12, including or excluding optional features. In this example, the method includes receiving a content type identifier from a source of the content to be displayed and determining the sampling rate based, at least in part, on the content type identifier. Optionally, the content type identifier identifies a type of content to be displayed on a first portion of the display, and the method includes receiving a second content type identifier from the source, the second content identifier identifying another type of content to be displayed on a second portion of the display.

Example 14 includes the method of any one of examples 10 to 13, including or excluding optional features. In this example, the method includes transitioning the sampling rate from a dynamic sampling rate to an intermediate sampling rate, and remaining at the intermediate sampling rate for a specified amount of time before transitioning to a static sampling rate.

Example 15 includes the method of any one of examples 10 to 14, including or excluding optional features. In this example, the method includes receiving a sampling rate identifier from a source of the content to be displayed and sampling the output frame data at the sampling rate identified by the sampling rate identifier.

Example 16 includes the method of any one of examples 10 to 15, including or excluding optional features. In this example, the method includes sampling a first portion of the output frame data at a first sampling rate and sampling a second portion of the output frame data at a second sampling rate different from the first sampling rate.

Example 17 includes the method of any one of examples 10 to 16, including or excluding optional features. In this example, determining the sampling rate includes analyzing user behavior.

Example 18 includes the method of any one of examples 10 to 17, including or excluding optional features. In this example, the method includes if the electronic device enters a panel self-refresh mode, computing the aging data based on data received from a timing controller included in the display.

Example 19 is a computer-readable medium. The computer-readable medium includes instructions that direct the processor to receive input frame data corresponding to content to be displayed on a display of an electronic device. The display includes a plurality of Light Emitting Diodes (LEDs). The computer-readable medium also includes instructions that direct the processor to adjust the input frame data to generate output frame data based on a degree of aging of the LEDs and send the output frame data to the display. The computer-readable medium also includes instructions that direct the processor to determine a sampling rate based on a type of the content to be displayed, and sample the output frame data at the sampling rate to accumulate aging data that describes the degree of aging of the LEDs.

Example 20 includes the computer-readable medium of example 19, including or excluding optional features. In this example, the instructions to direct the processor to determine the sampling rate direct the processor to determine a first sampling rate if the content to be displayed is dynamic and determine a second sampling rate if the content to be displayed is static, wherein the second sampling rate is lower than the first sampling rate.

Example 21 includes the computer-readable medium of any one of examples 19 to 20, including or excluding optional features. In this example, the instructions direct the processor to analyze the input frame data to determine the type of the content to be displayed based on a degree of change in the input frame data.

Example 22 includes the computer-readable medium of any one of examples 19 to 21, including or excluding optional features. In this example, the instructions direct the processor to receive a content type identifier from a source of the content to be displayed and determine the sampling rate based, at least in part, on the content type identifier. Optionally, the content type identifier identifies the type of content to be displayed on a first portion of the display, and the instructions direct the processor to receive a second content type identifier from the source, wherein the second content identifier identifies another type of content to be displayed on a second portion of the display. Optionally, the source is an application running on a laptop computer.

Example 23 includes the computer-readable medium of any one of examples 19 to 22, including or excluding optional features. In this example, the instructions to direct the processor to determine a sampling rate direct the processor to receive a sampling rate identifier from a source of the content to be displayed.

Example 24 includes the computer-readable medium of any one of examples 19 to 23, including or excluding optional features. In this example, the instructions direct the processor to sample a first portion of the output frame data at a first sampling rate and sample a second portion of the output frame data at a second sampling rate different from the first sampling rate.

Example 25 includes the computer-readable medium of any one of examples 19 to 24, including or excluding optional features. In this example, the instructions direct the processor to analyze user behavior to determine the sampling rate.

Example 26 includes the computer-readable medium of any one of examples 19 to 25, including or excluding optional features. In this example, the LEDs are Organic LEDs (OLEDS).

Example 27 is an electronic device to implement aging compensation for a display of the electronic device. The electronic device includes logic to receive input frame data corresponding to content to be displayed on a display of an electronic device. The display includes a plurality of Light Emitting Diodes (LEDs). The electronic device also includes logic to adjust the input frame data to generate output frame data based on a degree of aging of the LEDs and send the output frame data to the display. The electronic device also includes logic to determine a sampling rate based on a type of the content to be displayed, and logic to sample the output frame data at the sampling rate to accumulate aging data that describes the degree of aging of the LEDs.

Example 28 includes the electronic device of example 27, including or excluding optional features. In this example, the logic to determine the sampling rate includes logic to determine a first sampling rate if the content to be displayed is dynamic and determine a second sampling rate if the content to be displayed is static, wherein the second sampling rate is lower than the first sampling rate.

Example 29 includes the electronic device of any one of examples 27 to 28, including or excluding optional features. In this example, the electronic device includes logic to analyze the input frame data to determine the type of the content to be displayed based on a degree of change in the input frame data.

Example 30 includes the electronic device of any one of examples 27 to 29, including or excluding optional features. In this example, the electronic device includes logic to receive a content type identifier from a source of the content to be displayed and determine the sampling rate based, at least in part, on the content type identifier. Optionally, the content type identifier identifies the type of content to be displayed on a first portion of the display, and the electronic device includes logic to receive a second content type identifier from the source, wherein the second content identifier identifies another type of content to be displayed on a second portion of the display. Optionally, the source is an application running on a laptop computer.

Example 31 includes the electronic device of any one of examples 27 to 30, including or excluding optional features. In this example, the logic to determine a sampling rate includes logic to receive a sampling rate identifier from a source of the content to be displayed.

Example 32 includes the electronic device of any one of examples 27 to 31, including or excluding optional features. In this example, the electronic device includes logic to sample a first portion of the output frame data at a first sampling rate and sample a second portion of the output frame data at a second sampling rate different from the first sampling rate.

Example 33 includes the electronic device of any one of examples 27 to 32, including or excluding optional features. In this example, the electronic device includes logic to analyze user behavior to determine the sampling rate.

Example 34 includes the electronic device of any one of examples 27 to 33, including or excluding optional features. In this example, the LEDs are Organic LEDs (OLEDS).

Example 35 is an apparatus configured to implement aging compensation for a display. The apparatus includes means for receiving input frame data corresponding to content to be displayed on a display of an electronic device. The display includes a plurality of Light Emitting Diodes (LEDs). The apparatus also includes means for adjusting the input frame data to generate output frame data based on a degree of aging of the LEDs and sending the output frame data to the display. The apparatus also includes means for determining a sampling rate based on a type of the content to be displayed, and means for accumulating aging data that describes the degree of aging of the LEDs by sampling the output frame data at the sampling rate.

Example 36 includes the apparatus of example 35, including or excluding optional features. In this example, the means for determining the sampling rate includes means for determining a first sampling rate if the content to be displayed is dynamic and determining a second sampling rate if the content to be displayed is static, wherein the second sampling rate is lower than the first sampling rate.

Example 37 includes the apparatus of any one of examples 35 to 36, including or excluding optional features. In this example, the apparatus includes means for determining the type of the content to be displayed by analyzing the input frame data to identify a degree of change in the input frame data.

Example 38 includes the apparatus of any one of examples 35 to 37, including or excluding optional features. In this example, the apparatus includes means for receiving a content type identifier from a source of the content to be displayed and determining the sampling rate based, at least in part, on the content type identifier. Optionally, the content type identifier identifies a type of content to be displayed on a first portion of the display, and the apparatus includes means for receiving a second content type identifier from the source, the second content identifier identifying another type of content to be displayed on a second portion of the display.

Example 39 includes the apparatus of any one of examples 35 to 38, including or excluding optional features. In this example, the means for determining the sampling rate transitions the sampling rate from a dynamic sampling rate to an intermediate sampling rate, and remains at the intermediate sampling rate for a specified amount of time before transitioning to a static sampling rate.

Example 40 includes the apparatus of any one of examples 35 to 39, including or excluding optional features. In this example, the apparatus includes means for receiving a sampling rate identifier from a source of the content to be displayed and sampling the output frame data at the sampling rate identified by the sampling rate identifier.

Example 41 includes the apparatus of any one of examples 35 to 40, including or excluding optional features. In this example, the apparatus includes means for sampling a first portion of the output frame data at a first sampling rate and sampling a second portion of the output frame data at a second sampling rate different from the first sampling rate.

Example 42 includes the apparatus of any one of examples 35 to 41, including or excluding optional features. In this example, the means for determining the sampling rate includes means for analyzing user behavior.

Example 43 includes the apparatus of any one of examples 35 to 42, including or excluding optional features. In this example, the apparatus includes means for computing the OLED aging data based on data received from a timing controller included in the display if the electronic device enters a panel self-refresh mode.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
- a display comprising pixels, each pixel comprising one or more Light Emitting Diodes (LEDs);
- a display aging compensation unit to receive input frame data corresponding to content to be displayed, adjust the input frame data to generate output frame data based on a degree of aging of the LEDs, and send the output frame data to the display; and
- a display aging monitoring and compensation processing unit to accumulate aging data that describes the degree of aging of the LEDs, wherein the aging data is to be accumulated by sampling the output frame data at a variable sampling rate, wherein the variable sampling rate varies depending on whether the content to be displayed is static or dynamic, and wherein the variable sampling rate is equal to a refresh rate of the display if dynamic content is displayed and the variable sampling rate is equal to a multiple of the refresh rate of the display if static content is displayed.

2. The electronic device of claim 1, wherein the display aging monitoring and compensation processing unit is to use a first sampling rate if the content to be displayed is dynamic and the display aging monitoring and compensation processing unit is to use a second sampling rate if the content to be displayed is static, wherein the second sampling rate is lower than the first sampling rate.

3. The electronic device of claim 1, wherein the display aging compensation unit is included in a graphics processor, and the graphics processor determines the type of the content to be displayed based on a degree of change in the input frame data.

4. The electronic device of claim 1, wherein the type of the content is to be identified by an application that is to generate the content, and the application is to send a corresponding content type identifier to the display aging monitoring and compensation processing unit, wherein the display aging monitoring and compensation processing unit determines the variable sampling rate based, at least in part, on the content type identifier.

5. The electronic device of claim 4, wherein the application that is to generate the content sends a sampling rate identifier to the display aging monitoring and compensation processing unit, wherein the display aging monitoring and compensation processing unit is to sample the output frame data at the variable sampling rate identified by the sampling rate identifier.

6. The electronic device of claim 1, wherein the variable sampling rate transitions from a dynamic sampling rate to an intermediate sampling rate, and remains at the intermediate sampling rate for a specified amount of time before transitioning to a static sampling rate.

7. The electronic device of claim 1, wherein the variable sampling rate to be applied by the display aging monitoring and compensation processing unit is based, at least in part, on past user behavior.

8. The electronic device of claim 1, wherein the LEDs are Organic LEDs (OLEDS).

9. The electronic device of claim 1, wherein if the electronic enters a panel self-refresh mode, the aging data can be computed based on data received from a timing controller included in the display.

10. The electronic device of claim 1, wherein the electronic device is a laptop computer.

11. A method, comprising:
- receiving input frame data corresponding to content to be displayed on a display of an electronic device, the display comprising a plurality of Light Emitting Diodes (LEDs);
- adjusting the input frame data to generate output frame data based on a degree of aging of the LEDs and sending the output frame data to the display;
- determining a sampling rate based on whether the content to be displayed is static or dynamic, wherein the sampling rate is determined to be equal to a refresh rate of the display if the content to be displayed is dynamic and the sampling rate is determined to be equal to a multiple of the refresh rate of the display if the content to be displayed is static; and
- accumulating aging data that describes the degree of aging of the LEDs by sampling the output frame data at the sampling rate.

12. The method of claim 11, wherein determining the sampling rate comprises determining a first sampling rate if the content to be displayed is dynamic and determining a second sampling rate if the content to be displayed is static, wherein the second sampling rate is lower than the first sampling rate.

13. The method of claim 11, comprising determining the type of the content to be displayed by analyzing the input frame data to identify a degree of change in the input frame data.

14. The method of claim 11, comprising receiving a content type identifier from a source of the content to be displayed and determining the sampling rate based, at least in part, on the content type identifier.

15. The method of claim 14, wherein the content type identifier identifies a type of content to be displayed on a first portion of the display, the method comprising receiving a second content type identifier from the source, the second content identifier identifying another type of content to be displayed on a second portion of the display.

16. The method of claim 14, transitioning the sampling rate transitions from a dynamic sampling rate to an intermediate sampling rate, and remaining at the intermediate sampling rate for a specified amount of time before transitioning to a static sampling rate.

17. The method of claim 11, comprising, if the electronic enters a panel self-refresh mode, computing the aging data based on data received from a timing controller included in the display.

18. A non-transitory computer-readable medium, comprising instructions to direct a processor to implement aging compensation for a display, the instructions to direct the processor to:
- receive input frame data corresponding to content to be displayed on a display of an electronic device, the display comprising a plurality of Light Emitting Diodes (LEDs);
- adjust the input frame data to generate output frame data based on a degree of aging of the LEDs and send the output frame data to the display;

determine a sampling rate based on whether the content to be displayed is static or dynamic, wherein the sampling rate is determined to be equal to a refresh rate of the display if the content to be displayed is dynamic and the sampling rate is determined to be equal to a multiple of the refresh rate of the display if the content to be displayed is static; and sample the output frame data at the sampling rate to accumulate aging data that describes the degree of aging of the LEDs.

19. The non-transitory computer-readable medium of claim 18, wherein the instructions to direct the processor to determine the sampling rate direct the processor to determine a first sampling rate if the content to be displayed is dynamic and determine a second sampling rate if the content to be displayed is static, wherein the second sampling rate is lower than the first sampling rate.

20. The non-transitory computer-readable medium of claim 18, wherein the instructions direct the processor to analyze the input frame data to determine the type of the content to be displayed based on a degree of change in the input frame data.

21. The non-transitory computer-readable medium of claim 18, wherein the instructions direct the processor to receive a content type identifier from a source of the content to be displayed and determine the sampling rate based, at least in part, on the content type identifier.

22. The non-transitory computer-readable medium of claim 21, wherein the content type identifier identifies the type of content to be displayed on a first portion of the display, and the instructions direct the processor to receive a second content type identifier from the source, wherein the second content identifier identifies another type of content to be displayed on a second portion of the display.

23. The non-transitory computer-readable medium of claim 21, wherein the source is an application running on a laptop computer.

24. The non-transitory computer-readable medium of claim 18, wherein the instructions to direct the processor to determine a sampling rate direct the processor to receive a sampling rate identifier from a source of the content to be displayed.

25. The non-transitory computer-readable medium of claim 18, wherein the instructions to direct the processor to sample a first portion of the output frame data at a first sampling rate and sample a second portion of the output frame data at a second sampling rate different from the first sampling rate.

* * * * *